(12) United States Patent
Russalian

(10) Patent No.: US 9,989,095 B2
(45) Date of Patent: Jun. 5, 2018

(54) WATER PUMP BEARING WITH INTEGRATED MECHANICAL SEAL

(71) Applicant: Schaeffler Technologies GmbH & Co. KG, Herzogenaurach (DE)

(72) Inventor: Vigel Russalian, Troy, MI (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 646 days.

(21) Appl. No.: 14/537,087

(22) Filed: Nov. 10, 2014

(65) Prior Publication Data

US 2015/0128415 A1    May 14, 2015

Related U.S. Application Data

(60) Provisional application No. 61/904,150, filed on Nov. 14, 2013.

(51) Int. Cl.
| | |
|---|---|
| F04D 29/046 | (2006.01) |
| F16C 33/76 | (2006.01) |
| F16C 33/72 | (2006.01) |
| F04D 29/049 | (2006.01) |
| F04D 29/12 | (2006.01) |
| F04D 29/62 | (2006.01) |
| F16C 33/78 | (2006.01) |

(52) U.S. Cl.
CPC ............ *F16C 33/76* (2013.01); *F04D 29/049* (2013.01); *F04D 29/126* (2013.01); *F04D 29/628* (2013.01); *F16C 33/726* (2013.01); *F16C 33/7886* (2013.01); *F16C 2360/44* (2013.01); *Y10T 29/49236* (2015.01)

(58) Field of Classification Search
CPC .... F16C 33/76; F16C 33/7886; F16C 33/726; F16C 2360/44; F04D 29/049; F04D 29/126; F04D 29/628
See application file for complete search history.

(56) References Cited

U.S. PATENT DOCUMENTS 3,372,939 A * 3/1968 Coulombe ............... F16J 15/36
                                                            277/375
3,506,276 A * 4/1970 Jorgen .................. F04D 29/128
                                                            277/364

(Continued)

FOREIGN PATENT DOCUMENTS

| EP | 1262675 | 12/2002 |
|---|---|---|
| EP | 1391613 | 2/2004 |

*Primary Examiner* — Ryan J Walters
(74) *Attorney, Agent, or Firm* — Volpe and Koenig, PC

(57) ABSTRACT

An integrated shaft bearing assembly is provided having a housing with at least one bearing located in the housing that supports a shaft that extends through the housing. A vent ring is located at one axial end of the housing, with the vent ring having a radial flange that extends toward the shaft. A face seal assembly including a seal support ring is fixed on the shaft. The face seal assembly includes a bellows spring connected to the seal support ring, a face seal carrier connected to the bellows spring, with the face seal carrier supporting a face seal against the face of the radial flange. Here the vent ring is integrated with the integrated shaft bearing and provides a surface for the mechanical seal as well as venting to avoid pressure build up in a region of the mechanical seal between the mechanical seal and the bearing.

9 Claims, 2 Drawing Sheets

(56) References Cited

U.S. PATENT DOCUMENTS 4,973,063 A * 11/1990 Korenblit .............. F04D 29/106
                                                        277/348
2008/0115745 A1* 5/2008 Kawaike .................. F01P 5/04
                                                       123/41.02

* cited by examiner

WATER PUMP BEARING WITH INTEGRATED MECHANICAL SEAL

INCORPORATION BY REFERENCE

The following documents are incorporated herein by reference as if fully set forth: U.S. Provisional Application No. 61/904,150, filed Nov. 14, 2013.

FIELD OF INVENTION

The present invention relates to an integrated shaft bearing assembly, in particular for use in a water pump of an internal combustion engine.

BACKGROUND

In automotive applications, there is a push for energy efficiency as well as reduced cost. One area in which cost savings as well as energy efficiency can be achieved is in the reduced material weight used for assembling a vehicle. This can be achieved by changing the materials used so that the weight is reduced without sacrificing strength or functionality or by reducing the size of parts based on modified designs.

It is already known in connection with water pumps to use a pre-assembled integrated shaft bearing which is installed in a water pump housing. A separate mechanical seal is then installed to isolate the bearing from the engine coolant fluid prior to the impeller and pulley being installed on the shaft provided as part of the integrated shaft bearing assembly. In this integrated shaft bearing assembly, the rolling elements roll directly on an outer surface of the shaft. However, in the known water pumps the mechanical seal to isolate the bearing from the engine coolant fluid is installed in the water pump housing during assembly of the water pump as a separate part. This requires the water pump housing to be configured to receive a separate seal, resulting in a heavier design than would ultimately be necessary as well as requires extra steps during assembly of the water pump.

It would be desirable to provide an integrated shaft bearing assembly for use in water pump applications which improves upon the known arrangements and allow for easier assembly.

SUMMARY

Briefly stated, an integrated shaft bearing assembly (ISB) is provided having a housing with at least one bearing located in the housing that supports a shaft that extends through the housing. A vent ring is located at one axial end of the housing, with the vent ring having a radial flange that extends toward the shaft. A face seal assembly including a seal support ring that is fixed on the shaft is provided. The face seal assembly includes a bellows spring connected to the seal support ring, a face seal carrier connected to the bellows spring, with the face seal carrier supporting a face seal against the face of the radial flange. Here the vent ring is integrated with the integrated shaft bearing and provides a surface for the mechanical seal as well as venting to avoid pressure build up in a region of the mechanical seal between the mechanical seal and the bearing. Further, the face seal assembly itself is compact and designed to function under maximum pressure and temperature inside the water pump and is provided as a unit with the ISB allowing simpler assembly of the water pump by providing a completely integrated bearing assembly which includes the mechanical seal. This combination of the integrated shaft bearing with the mechanical seal, a vent ring, as well as oil/grease seals on either side of the housing for the anti-friction bearing provides an integrated bearing that excludes the requirement of an additional mechanical seal to be provided in the pump housing during assembly, which inherently requires consideration of additional design and functional issues.

In another aspect, the vent ring includes at least one recess or opening in an axial extending portion thereof for venting. Further, a dust seal is located on a radially inner end of the radial flange about an opening defined through the vent ring, with the dust seal contacting the shaft.

In a preferred embodiment, the seal support ring is press fit on the shaft. Preferably, the face seal is formed of a butyl rubber or other polymeric material and may include a PTFE or other anti-friction coating.

As noted above, preferably grease seals are located on each axial end of the housing to maintain oil/grease in the area of the bearings.

In another aspect, a simplified method of assembling the water pump is provided which includes providing an ISB which includes the vent ring and mechanical face seal as noted above. Here the ISB is pressed into the water pump housing as an integrated unit. An impeller is then attached to one end of the shaft, and a drive pulley is attached to the opposite end of the shaft. This eliminates a manufacturing step from the prior known water pump assemblies which included an integrated shaft bearing without the vent ring or mechanical face seal assembly.

Since the ISB according to the invention includes the vent ring as well as the mechanical face seal assembly, this reduces the space requirements as well as the materials required in the water pump housing, which translates into lighter and more efficient engines. Further, the integration of the mechanical seal with the ISB in a compact manner allows the use of previously unused space while providing the same or better sealing. Further, the integration of the mechanical seal into the ISB reduces the bearing to impeller distance, allowing for a reduced shaft length. Further, the design requirements for the water pump housing are simplified since the sealing is provided for in the ISB assembly.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
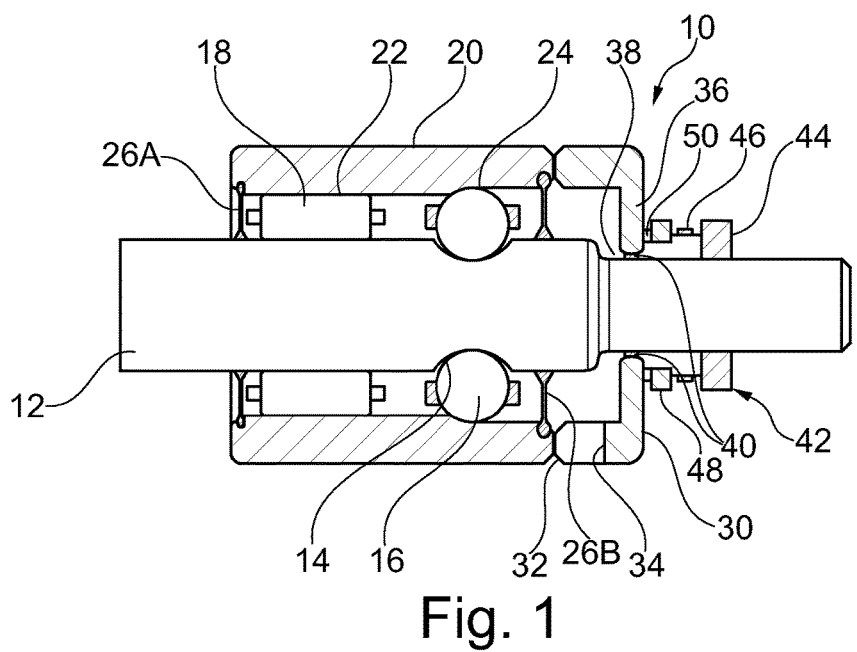
FIG. 1 is a cross-sectional view of an integrated shaft bearing assembly in accordance with a preferred embodiment of the invention.

Certain terminology is used in the following description for convenience only and is not limiting. The words "front,"

"rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIG. 1, an integrated shaft bearing assembly (ISB) 10 according to a preferred embodiment of the present invention is shown. The ISB 10 includes a shaft 12 having a groove 14 defined therein which receives balls 16 for a rolling bearing therein, with the outer surface of the shaft 12 in the area of the groove 14 acting as the inner bearing race. Rollers 18 are also provided on an adjacent portion of the shaft 12 which forms the inner race for a second rolling bearing. An outer housing 20 is located over the rollers 18 and balls 16 as part of the ISB 10. The outer housing 20 forms the outer race 22 for the rollers 18 and preferably also includes at least a partial groove 24 which forms the outer race for the balls 16. Preferably, grease seals 26A, 26B are provided at each axial end of the housing 20. Preferably, the shaft 12, balls 16, rollers 18 and housing 20 are made of tool steel and are hardened in order to provide a long-life ISB 10. As shown, the balls 16 and rollers 18 can be held in position via cages. Preferably, the area contained via the grease seals 26A, 26B is filled with a long-life lubricant, such as a bearing grease or lubricant. While the bearings shown in the exemplary embodiment are a ball bearing and a roller bearing, various other bearing arrangements could be provided.

Figure 2:
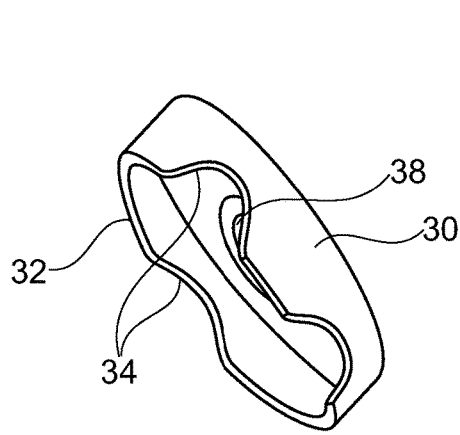
FIG. 2 is a perspective view of a vent ring used in connection with the integrated shaft bearing assembly of FIG. 1.

A vent ring 30, shown in detail in FIG. 2, is located about the shaft 12 at one axial end of the housing 20. The vent ring 30 includes at least one recess or opening 34 at an axially extending portion thereof facing the housing 20, and also includes an axial end 32 adapted to contact the housing 20. A radial flange 36 extends inwardly from the vent ring outer surface and includes an opening 38 defined therethrough, through which the shaft 12 extends. Preferably, a dust seal, such as a felt ring 40 is located at the radially inner end of the radial flange 36 about the opening 38 defined through the vent ring 30, with the dust seal 40 contacting the shaft 12. Various other types of seals could be used for the seal 40.

Figure 3:
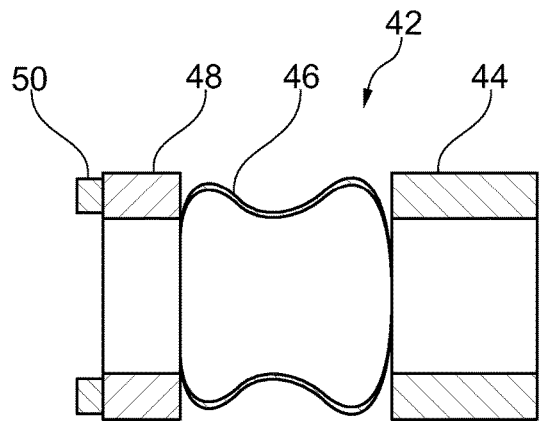
FIG. 3 is an enlarged cross-section view showing the face seal assembly used in the integrated shaft bearing assembly of FIG. 1.

A face seal assembly 42 is located about the shaft 12 adjacent to the vent ring 30. The face seal assembly 42 is shown in detail in FIG. 3, and includes a seal support ring 44 that is fixed on the shaft 12. A bellows spring 46 is connected to the seal support ring 44 and extends to a face seal carrier 48. A face seal 50 is supported by the face seal carrier 48 against a face of the radial flange 36 of the vent ring 30. The face seal 50 is preferably made of butyl rubber or another suitable polymeric material, and may have a PTFE or other anti-friction coating for contact with the face of the radial flange 36. Other polymeric materials could be used as the face seal 50. The bellows spring 46 can be a metal bellows spring, or can be formed of a polymeric material or a combination of a metal spring and a polymeric material to provide a continuous sleeve surface between the seal support ring 44 and the face seal carrier 48 that resiliently biases the face seal 50 against the radial flange 36.

The seal support ring 44 is preferably press fit on the shaft 12. However, it can be connected by other means, such as a screw clamp, adhesive or other suitable connection.

The ISB 10 is preferably pre-assembled and provided as an integrated unit to, for example, a water pump manufacturer in order to simplify assembly of a water pump.

Figure 4:
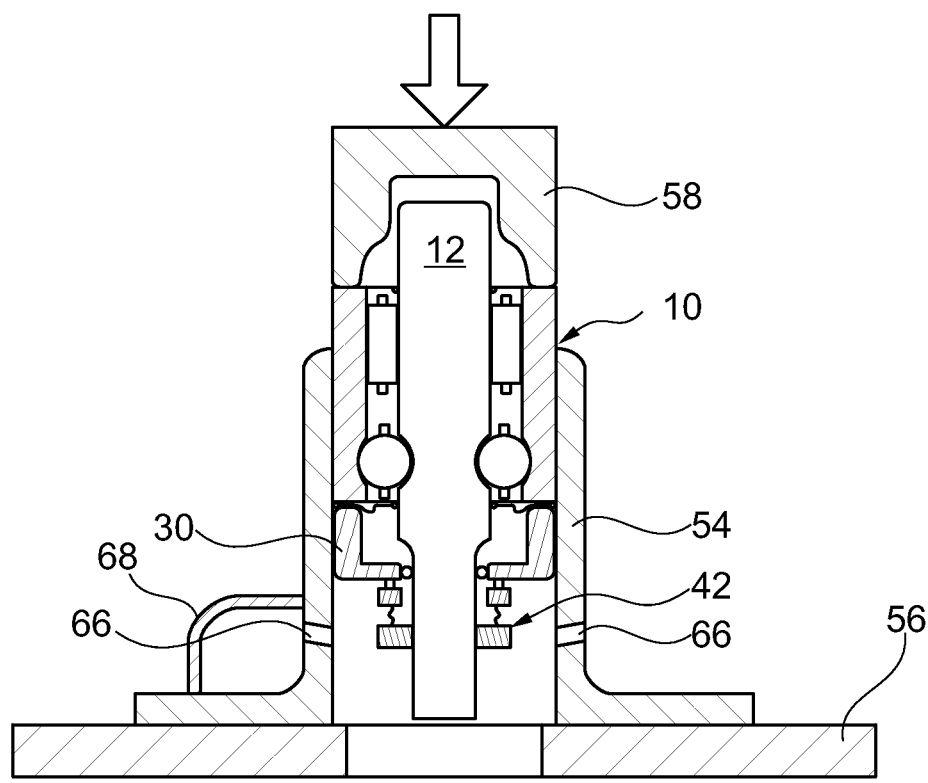
FIG. 4 is an elevational view, in cross-section, showing assembly of the integrated shaft bearing assembly of FIG. 1 into a water pump housing.

Referring to FIG. 4, the assembly of a water pump using the ISB 10 as described above in a simplified manner is illustrated. Here, the ISB 10 including the shaft 12, the vent ring 30, and the face seal assembly 42 which are provided as an integral unit are pressed into a water pump housing 54 by applying a force (indicated by the arrow) against a driving mandrel 58 while the housing 54 is supported on a press plate 56. The housing 54 is shown with vent openings 66 adapted to vent the area between the grease seal 26B and the face seal assembly 42 as well as a condensate reservoir 68. Here, the ISB 10 is shown partially inserted. A stop can be provided on the water pump housing 54 or the position of the ISB 10 can be established via other means such as an end surface of the water pump housing being contacted by the mandrel 58 once the ISB 10 is set to the proper depth. After the ISB 10 is pressed into the water pump housing 54, there is no need to separately install a face seal to isolate the bearing elements of the ISB 10 from the cooling fluid carried by the water pump in use.

Figure 5:
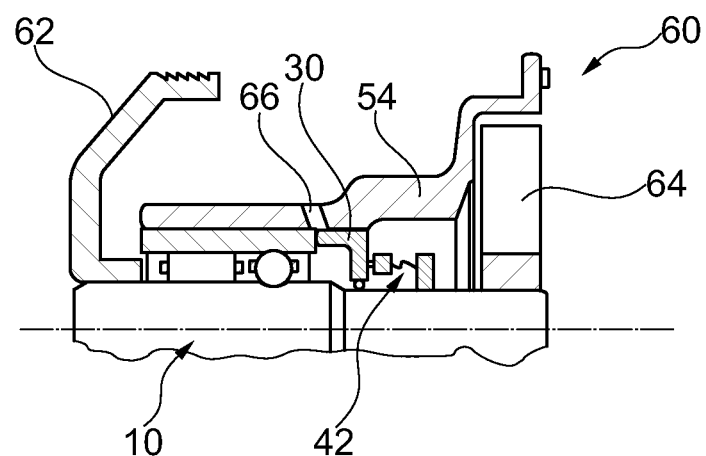
FIG. 5 is a half cross-sectional view of an assembled water pump using the integrated shaft bearing assembly according to FIG. 1.

FIG. 5 shows a completed water pump 60 in which an impeller 64 has been attached to one end of the shaft 12 and a drive pulley 62 is attached to an opposite axial end of the shaft 12. The pulley 62 and impeller 64 can be pressed onto the shaft 12 or may be connected via other means.

This arrangement of the ISB 10 which includes the face seal assembly 42 allows the length of the shaft 12 to be reduced in comparison with the prior known assemblies since additional space previously not usable due to the requirement to install a separate face seal assembly 42 can now be saved. This results in a potentially more compact and lighter weight overall water pump 60 than previously available.

Those skilled in the art will recognize that the ISB 10 in accordance with the present invention can be used in applications other than water pumps in order to provide a compact bearing assembly.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An integrated shaft bearing assembly, comprising:
   a housing;
   at least one bearing located in the housing that supports a shaft that extends through the housing;
   a vent ring located at one axial end of the housing, the vent ring having a radial flange that extends toward the shaft, wherein the vent ring is configured to avoid pressure build up between a face seal assembly and the bearing; and the face seal assembly including a seal support ring fixed on the shaft, a bellows spring connected to the seal support ring, a face seal carrier connected to the bellows spring, and the face seal carrier supporting a face seal against a face of the radial flange.

2. The integrated shaft bearing assembly of claim 1, wherein the vent ring includes at least one recess or opening in an axially extending portion thereof.

3. The integrated shaft bearing assembly of claim 1, wherein a dust seal is located on a radially inner end of the radial flange about an opening defined through the vent ring, the dust seal contacting the shaft.

4. The integrated shaft bearing assembly of claim 1, wherein the seal support ring is press fit on the shaft.

5. The integrated shaft bearing assembly of claim 1, wherein the bellows spring is formed as a metal bellows or a polymeric material.

6. The integrated shaft bearing assembly of claim 1, wherein the face seal is formed from a PTFE coated butyl rubber or polymeric material.

7. The integrated shaft bearing assembly of claim 1, further comprising grease seals located on each axial end of the housing.

8. The integrated shaft bearing assembly of claim 1, wherein the vent ring includes at least one opening facing the housing.

9. A method of assembling a water pump, comprising:
providing an integrated shaft bearing assembly including a housing, at least one bearing located in the housing that support a shaft that extends through the housing, grease seals located on each axial end of the housing, a vent ring located at one axial end of the housing, the vent ring having a radial flange that extends toward the shaft, wherein the vent ring is configured to avoid pressure build up between a face seal assembly and the bearing; and the face seal assembly including a seal support ring fixed on the shaft, a bellows spring connected to the seal support ring, a face seal carrier connected to the biasing sleeve, and the face seal carrier supporting a face seal against a face of the radial flange;
pressing the integrated shaft bearing assembly into a water pump housing as an integrated unit;
attaching an impeller to one end of the shaft; and
attaching a drive pulley to an opposite axial end of the shaft.

* * * * *